(12) United States Patent  
Zakashansky et al.

(10) Patent No.: US 9,223,627 B2  
(45) Date of Patent: Dec. 29, 2015

(54) MANAGEMENT OF TASK ALLOCATION IN A MULTI-CORE PROCESSING SYSTEM

(71) Applicant: NICE-SYSTEMS LTD., Ra'anana (IL)

(72) Inventors: Eli Zakashansky, Ganey Tikva (IL); Roni Krivoshey, Ramat Hasharon (IL); Efim Kolodizner, Ashdod (IL); Uzi Baruch, Maale Adumim (IL); Karawan Shorosh, Nazareth (IL); Shlomi Haba, Petah Tiqva (IL)

(73) Assignee: NICE-SYSTEMS LTD., Ra'anana (IL)

( * ) Notice: Subject to any disclaimer, the term of this patent is extended or adjusted under 35 U.S.C. 154(b) by 305 days.

(21) Appl. No.: 13/944,881

(22) Filed: Jul. 18, 2013

(65) Prior Publication Data

US 2014/0298346 A1    Oct. 2, 2014

Related U.S. Application Data

(60) Provisional application No. 61/805,541, filed on Mar. 27, 2013.

(51) Int. Cl.  
*G06F 9/46* (2006.01)  
*G06F 9/50* (2006.01)

(52) U.S. Cl.  
CPC .................................. *G06F 9/5033* (2013.01)

(58) Field of Classification Search  
None  
See application file for complete search history.

(56) References Cited

U.S. PATENT DOCUMENTS

| | | | |
|---|---|---|---|
| 6,263,331 B1 * | 7/2001 | Liu et al. | |
| 6,614,843 B1 * | 9/2003 | Gordon et al. | 375/240.01 |
| 8,150,970 B1 * | 4/2012 | Whillock et al. | 709/226 |
| 2014/0129830 A1 * | 5/2014 | Raudaschl | 713/165 |

* cited by examiner

*Primary Examiner* — Adam Lee  
(74) *Attorney, Agent, or Firm* — Pearl Cohen Zedek Latzer Baratz LLP

(57) ABSTRACT

A system and method for management of task allocation in a multi-core processing system. A controller of the processing unit may, at an initialization stage determine a number of worker threads to be a prime number not smaller than a multiplication of the number of the processing cores and a predetermined factor, assign a worker identification number (ID) to each worker thread, wherein the worker IDs are consecutive positive integers ranging from zero to the number of workers minus one. At a processing state the controller may receive from a dispatcher of the processing system a task associated with a numeric context ID and designate the task to one of the worker threads, wherein the worker ID of the designated worker thread equals the numeric context ID of the task, modulo the number of worker threads.

19 Claims, 5 Drawing Sheets

मैनेजमेंट OF TASK ALLOCATION IN A
MANAGEMENT OF TASK ALLOCATION IN A MULTI-CORE PROCESSING SYSTEM

CROSS REFERENCE TO RELATED APPLICATIONS

This application claims the benefit of U.S. Ser. No. 61/805,541, filed on Mar. 27, 2013 and entitled Management of Task Allocation in a Multi-Core Processing System, which is incorporated in its entirety herein by reference.

BACKGROUND

In many computerized systems, concurrency may be achieved by sharing the resources of a central processing unit (CPU) between multiple users, multiple programs, multiple parts of a program, multiple events or multiple tasks. In many server applications, such as Web servers, database servers, file servers or mail servers, the number of tasks is large and the processing time of each individual task is short.

Typically, a pool of threads is created to perform the plurality of tasks, which are usually organized in a queue. In many applications, the number of threads remains constant to save thread creation and destruction overhead. The number of threads in the thread pool is chosen to maximize resource usage and performance. The number of threads may be based on percentage usage of the CPU, number of queued requests, and/or the number of processor cores in the system.

In a common implementation of a thread pool, all the tasks needed to be processed are arranged in a single queue and are distributed among the threads according to thread availability. This relatively simple implementation may be problematic when handling several tasks which are related and should be processed in a determined order since in this implementation, the order of processing the tasks may not be controlled.

According to another common solution, referred to as a worker pool, each thread has a dedicated queue referred to as a worker thread, and each task can be assigned to a specific worker thread by a management layer. For example, tasks may be distributed among queues according to a task identification number (ID). In this case, a complex management layer in required in order to ensure optimized processor utilization

SUMMARY

According to some embodiments of the invention, there is provided a method for allocating or assigning tasks to be executed in a processing unit by a predetermined number of one or more processing cores. The method may include: at an initialization stage: setting or determining a number of worker threads to be a prime number not smaller than a multiplication of the number of the processing cores and a predetermined factor; assigning a worker identification number (ID) to each worker thread, wherein the worker IDs are consecutive positive integers ranging from zero to the number of workers minus one; and at or during a processing state or stage: receiving from a dispatcher of the processing system a task associated with a numeric context ID; and assigning or designating the task to one of the worker threads, wherein the worker ID of the designated worker thread equals the numeric context ID of the task, modulo the number of worker threads.

Furthermore, according to embodiments of the present invention, the numeric context ID may be unique per context.

Furthermore, according to embodiments of the present invention, the numeric context ID may be constant per context.

Furthermore, according to embodiments of the present invention, the tasks may be writing buffers of files to a file system, wherein a plurality of buffers may hold context of a single file.

Furthermore, according to embodiments of the present invention, the numeric context ID may be a Hash code of a file name of the file that is written to the file system.

Furthermore, according to embodiments of the present invention, the tasks may be computer telephony integration (CTI) events.

Furthermore, according to embodiments of the present invention, the numeric context ID may equal Call ID.

Furthermore, according to embodiments of the present invention, the number of worker threads may be a smallest prime number not smaller than the number of processing cores multiplied by the predetermined factor.

Furthermore, according to embodiments of the present invention, the predetermined factor may equal one.

According to some embodiments of the invention, there is provided a processing unit, where the processing unit may include: one or more processing cores, a controller, and a unit memory comprising a machine-readable medium having stored thereon instructions that, if executed by the controller, may cause the controller to perform a method that may include: at an initialization period or stage: setting or determining a number of worker threads to be a prime number not smaller than a multiplication of the number of the processing cores and a predetermined factor, assigning a worker identification number (ID) to each worker thread, wherein the worker IDs are consecutive positive integers ranging from zero to the number of workers minus one, and at or during a processing stage or state: receiving from a dispatcher of the processing system a task associated with a numeric context ID, and designating the task to one of the worker threads, wherein the worker ID of the designated worker thread equals the numeric context ID of the task, modulo the number of worker threads.

According to some embodiments of the invention, there is provided a method for allocating tasks to be executed in a processing unit by a predetermined number of one or more processing cores. The method may include: setting a number of worker threads to equal a prime number not smaller than the number of processing cores; assigning a numeric context identification number (ID) to tasks, wherein related tasks are given a common numeric context ID; and assigning a task to a worker thread number that equals the remainder of a division of a numeric context ID of the task by the number of worker threads.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
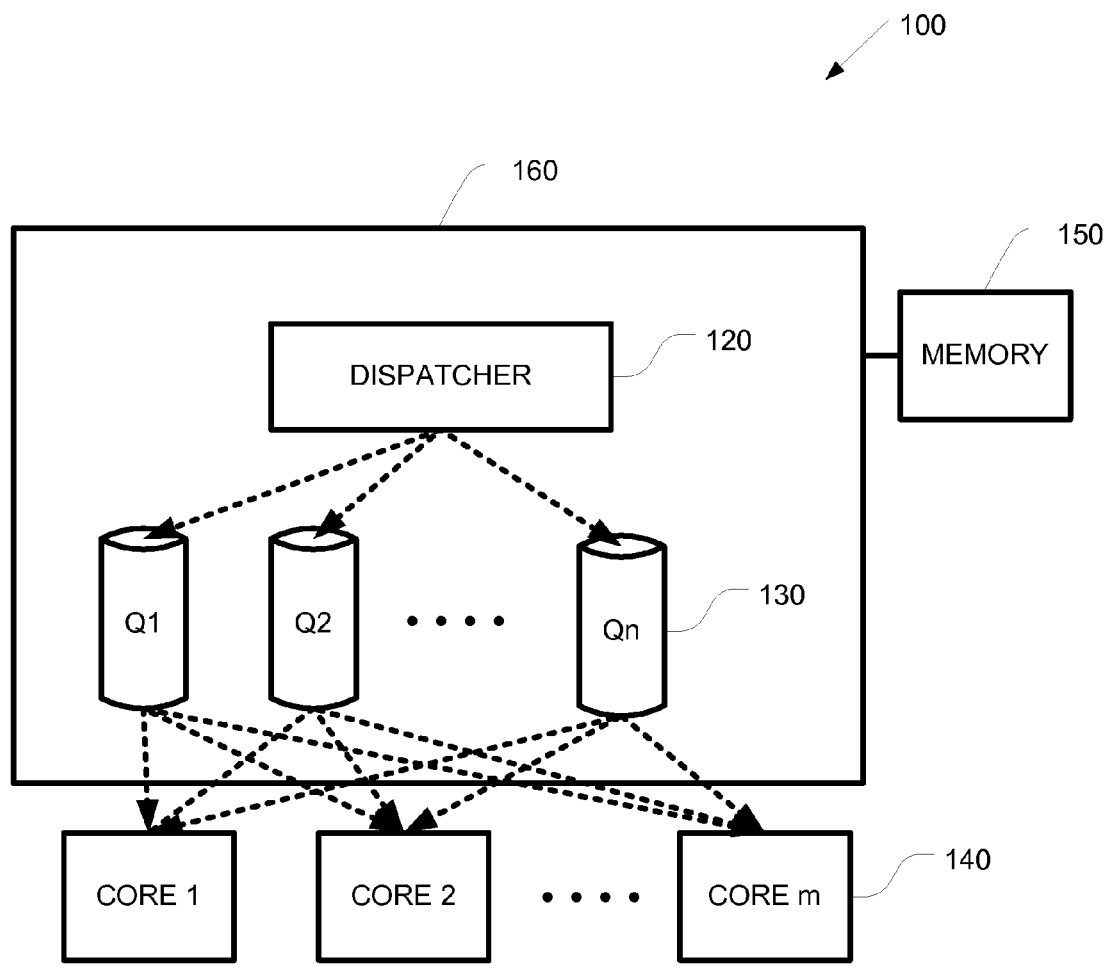
FIG. 1 is a schematic illustration of a processing system according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular jobs or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Managing multi worker threads (worker pools) according to embodiments of the present invention may be beneficial in single or multi-core processing units. As used herein multi-core processing units refers to processing units that include a plurality of processing cores. The plurality of processing cores and other modules of processing unit may be implemented on a single integrated circuit (IC), or on a plurality of interconnected IC's.

When used herein, a task may refer to a basic unit of a software program including a sequence of instructions. A thread may refer to a sequence of instructions to be performed sequentially by a processing core of a processing unit. A processing core of a processing unit may refer to a unit capable of processing a sequence of instructions. A worker thread may refer to a thread having a dedicated queue of tasks.

The following detailed description is directed to technologies for allocating multiple tasks to multiple processing cores of a central processing unit using worker threads processes.

According to the worker pool implementation tasks may be distributed among queues according to a task identification number (ID) using a modulus or modulo operator. As used herein the terms modulo and modulus relate to an operator which yields the remainder from the division of a first positive integer by a second positive integer, e.g. the task will be assigned to a worker number that equals the remainder of the division of the task ID by the number of worker threads. This method performs well when the task ID's are consequent or evenly distributed. However, if, for example, an even number of worker threads is used with the modulo operator, and tasks are provided with only even or only odd ID's, half of the worker threads will be idle while the other half will be overloaded, preventing optimized processor utilization. Avoiding this problem typically requires a complex management layer Reference is now made to FIG. 1, which is a schematic illustration of a processing unit according to embodiments of the present invention. A processing unit 100 may include a memory 150, a controller 160 and one or more processing cores 140 (m processing cores). Controller 160 may include a dispatcher 120 and a plurality of worker threads 130 (n worker threads). It will be appreciated by those skilled in the art that additional components and modules may be required for operation of processing unit 100. For example, processing unit 100 may also include a memory controller, an input/output controller, a system clock support, power management support, audio support, graphics support, or the like. Those of skill in the art will further note that the connection between modules and components in processing unit 100 need not necessarily be exactly as depicted in the schematic diagram. Controller 160 or another device may be configured to perform methods as disclosed herein, for example by executing code or instructions stored in memory 150.

Dispatcher 120 may receive tasks to be performed by processing unit 100. Tasks may arrive at processing unit 100 in a manner which depends on the system and application in which processing unit 100 operates. For example, tasks may arrive from a network protocol (such as HTTP, FTP, or POP), from a privet telephone exchange (PBX), by polling a database or in any other applicable manner. Dispatcher 120 may dispatch tasks to worker threads 130 according to embodiments of the present invention, as will be explained in detail hereinbelow. The tasks queued on worker threads 130 may be performed by processing cores 140, as known in the art. It should be readily understood by those skilled in the art that the tasks of each worker thread 130 are performed sequentially in the order in which they arrived at the queue of the worker thread 130, whereas tasks of different worker threads 130 may be performed in parallel.

Memory 150 may include any type of machine-readable medium. Memory 150 may store data, and/or may store instructions that, if executed by controller 160, cause controller 160 to perform the method for worker pool management according to embodiments of the present invention. For example memory 150 may include read only memory (ROM), random access memory (RAM) such as Dynamic Random Access Memory (DRAM), Static Random Access Memory (SRAM), Synchronized Dynamic Random Access Memory (SDRAM), Rambus Dynamic Random Access Memory (RDRAM), or the like, magnetic disk storage media; optical storage media; flash memory devices; and others. Memory 150 may include a non-volatile storage (NVS) device on which firmware and/or data may be stored such as Read-Only Memory (ROM), Flash memory, Erasable Programmable Read Only Memory (EPROM), Electronically Erasable Programmable Read Only Memory (EEPROM), Non-Volatile Random Access Memory (NVRAM), or the like.

According to some embodiments of the present invention processing device 100 may execute Operating System (OS) software that may include a module for management of a worker pool. OS software may include Android, Microsoft Windows®, Microsoft Windows, Windows Phone, Apple operating systems such as iOS and Mac OS X, IBM z/OS, Linux operating system, Unix operating system, or the like.

Embodiments of the present invention may be programmed in a programming language such as C, C++, Java or any other applicable programming language. The source code may be compiled to a binary code for later execution by the processing unit 100 by a static compiler or by a dynamic compiler executed by processing unit 100. A dynamic compiler may dynamically translate and optimize the source code at runtime. For example, a dynamic compiler may be implemented as part of a Java Virtual Machine environment in which Java source code files are dynamically compiled and executed by processing unit 100 using Just-In-Time (JIT) compiler techniques, or as part of a dynamic binary translator that may read statically compiled native code or byte code files and dynamically translate the code to add functionality, compatibility, and/or optimizations to the code.

According to embodiments of the present invention, worker pool management may include an initialization stage, period or phase which includes setting, determining or calculating the number of worker threads n, and a processing phase in which incoming tasks are distributed among worker threads 130.

Figure 2:
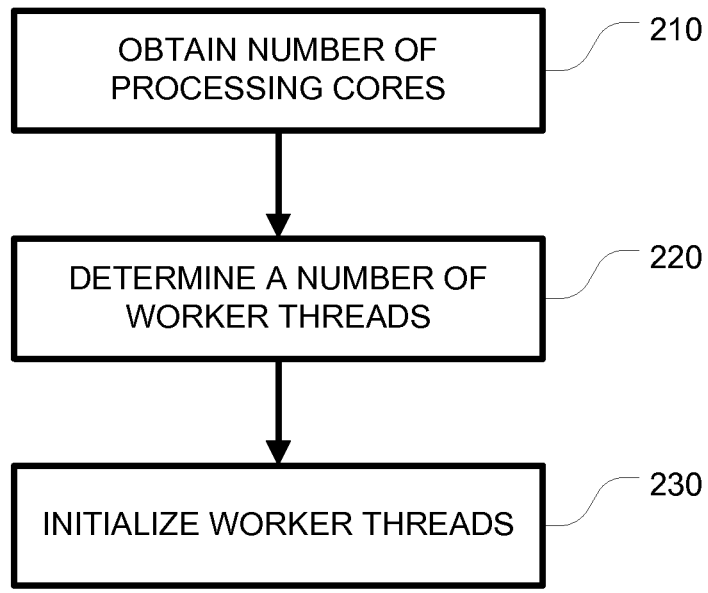
FIG. 2 is a flowchart illustrating a method of worker pool initialization, according to embodiments of the present invention.

Reference is now made to FIG. 2 which is a flowchart of a method of a worker pool initialization stage or period, according to embodiments of the present invention. According to embodiments of the present invention the number of worker threads may depend on the number of processing cores of processing unit 100. In block 210 the number of processing cores is obtained. The number of processing cores may be known and predetermined or it may be retrieved by the software using dedicated code. For example, when using MS .Net framework System.Environment.ProcessorCount property may be used to obtain the number of processing cores. When Java is the programming language Runtime.getRuntime( ).availableProcessors( ) function may be used.

In block 220 the number of worker threads is set, created or determined. According to embodiments of the present invention the number of worker threads may be set or determined to be a prime number not smaller than (namely larger or equal to) the product of or multiplication of the number of processing cores by a predefined factor, the factor typically being a positive integer. In some embodiments the number of worker threads may be the smallest prime number which is not smaller than the product of or multiplication of the number of processing cores by a predefined factor. The predefined factor may be derived for example by empiric testing and may vary between different systems and usage models. In some embodiments the predefined factor equals one and thus the number of worker threads is a prime number not smaller than the number of processing cores, or the smallest prime number not smaller than the number of processing cores.

As used herein usage model may refer to characteristics of the way processing cores 140 are used by the software application, with relation to efficiency of parallelism. For example, if typical tasks handled by system 100 contain a large number of operations which consume relatively large processing resources of processing cores 140, e.g., mathematical operations, than it may be most efficient to have a single thread running on a single processing core 140. On the other hand, in case the average task contains many operations that consume little processing resources of processing cores 140, e.g., input/output (IO) operations, than it may be more efficient to process several threads on a single processing core concurrently. Efficiency may be measured as percent of processing cores utilization, number of tasks performed per time unit, or by any other performance measure that may fit the application. The efficiency of parallelism may vary considerably between two different systems. Determining the correct usage model and predefined factor, that may yield efficient utilization of processing resources in system 100 for a given software application, may be done either by tasks and code analysis or empirically. Empirical determination of the predetermined factor may be done by running the software application on system 100 with typical tasks several times, each time with a different value of the predetermined factor, measuring the performances of system 100 for each predetermined factor and selecting the predetermined factor that resulted in the best performances.

In some environments the number of processing cores may be small or may even equal one. In a single processing core environment the smallest prime number bigger the number of processing cores equals 2 which is an even number. In this case the proposed algorithm may not solve the problem described hereinabove with relation to the worker pool method. If the number of processing cores is known this problem may be solved by manually setting the number of worker threads to a desired prime number bigger than 2. In case the number of processing cores is unknown in advance, the algorithm may be limited to choose a prime number bigger than a certain number, for example, bigger than 5, bigger than 7 bigger than 11, etc.

In some embodiments, if the application is intended for a specific hardware environment in which the number of processing cores is known, the number of worker threads may be set manually. In the more general case, in which the software should be exactable by various systems having unknown number of processing cores the number of worker threads may be calculated automatically by the software.

The following pseudo code presents an exemplary software implementation of automatic calculation of the number of worker threads.

1. candidate=THREADS_PER_CPU*Environment.ProcessorCount
2. while (candidate not prime)
   2.1 candidate=candidate+1
3. return Max(candidate, MINIMAL_NUMBER_OF_WORKERS);

In step 1 an initial candidate for the number of worker threads is calculated by multiplying the predetermined positive integer factor referred to in the code as THREADS_PER_CPU by the number of processing cores (Environment.ProcessorCount). If the candidate is a composite number (in most cases the first candidate is a composite number) it is incremented by one until the candidate value is a prime number. In applications were the number of processing cores is very low, including single processing core applications, this code may yield a worker threads number which may be too small, which may be problematic as explained hereinabove. To avoid this problem the code takes the maximum number between the prime candidate and a predetermined parameter which is the minimal allowed number of worker threads (MINIMAL_NUMBER_OF_WORKERS).

In block 230 worker threads may be initialized and a worker thread identification number (ID) may be assigned to each worker thread 130, wherein the worker thread IDs are consecutive positive integers ranging from zero to the number of worker threads minus one.

Figure 3:
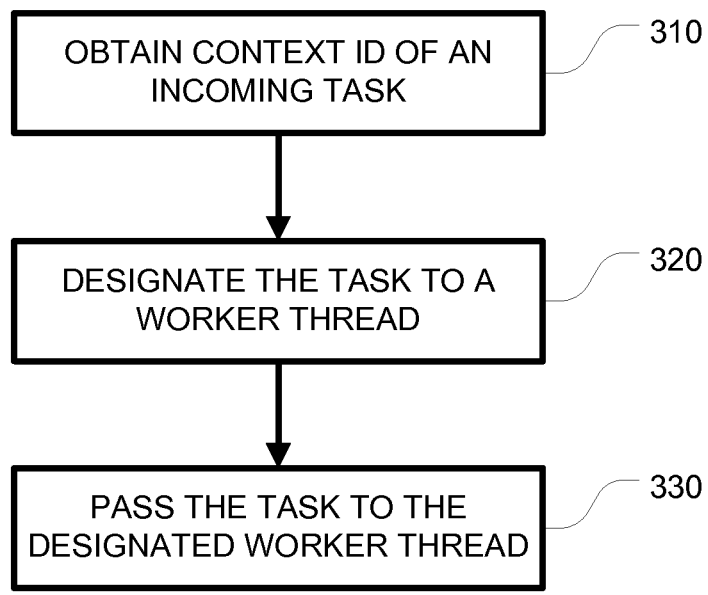
FIG. 3 is a flowchart illustrating a method of tasks distribution among worker threads, according to embodiments of the present invention.

Reference is now made to FIG. 3 which is a flowchart of a method of tasks distribution among worker threads, according to embodiments of the present invention. According to embodiments of the present invention, each incoming task may be associated with a numeric context ID, and assigning or designating a worker thread for each task may be based on the numeric context ID.

In block 310 the numeric context ID of an incoming task is obtained. According to some embodiments of the present invention, the numeric context ID is constant per context, similarly to a Hash Code. Thus, tasks related to the same context should receive the same numeric context ID. Each task that is handled by processing unit 100 should have a context ID which may be numeric or a data type (e.g., strings, dates etc.) convertible into an integer that is constant per context. If the context ID is numeric, the numeric context ID may equal the context ID. Otherwise the numeric context ID may be the conversion result of the context ID into a number. The context ID may identify the logical context the task it is related to. Thus, a plurality of related tasks may be given a common context ID, to mark those tasks as related to each other or to a bigger operation, e.g. a common context ID may be given to a plurality of tasks related to a single file, to a single telephone call etc. For example, if a single file is handled by a plurality of tasks, then the name of the file may be the common Context ID relating these tasks together. Since the file name is typically a string, the numeric context ID may be obtained by converting the file name into a number, for example using Hash code. Using a numeric context ID that is constant per context may ensure that tasks related to the same context are processed in the order in which they were received, as explained in detail hereinbelow. The variance of the numeric context IDs should be large enough to prevent uneven distribution among different workers. In some embodiments the numeric context ID may be unique or substantially unique per context.

In block 320 incoming tasks may be assigned or designated to worker threads 130. For each task the worker thread ID of the designated worker thread may equal the numeric context ID of the task modulo the number of worker threads. Designating a task to a worker thread may include distributing the task to that worker thread or marking that task as being intended to be queued in that worker thread. In step 330 the task is passed to the designated worker thread.

Figure 4:
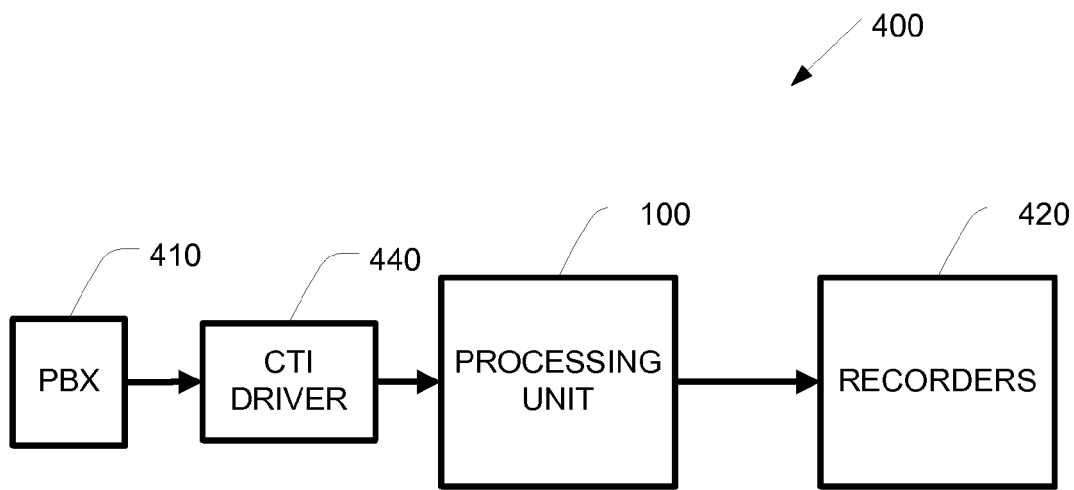
FIG. 4 is a schematic illustration of an exemplary system for recording communication data according to embodiments of the present invention.

Reference is now made FIG. 4 which is a schematic illustration of an exemplary system 400 for recording communication data utilizing worker pool management according to embodiments of the present invention. System 400 may include an organization's private branch exchange (PBX) 410 connected to recorders 420 via CTI driver 440 and processing unit 100. As calls are presented, PBX 410 may send communication data via processing unit 100 to recorder 420 using computer telephony integration (CTI) protocols by generating CTI events such as "Start Call", "End Call" etc. CTI driver 440 may receive these CTI events from PBX 410 and invoke related tasks in response. The invoked tasks may be transferred by CTI driver 440 to dispatcher 120 (depicted in FIG. 1) of processing unit 100. Processing unit 100 may receive the tasks from CTI driver 440 process the tasks and perform, for example, recording of communication data of calls on recorders 420.

Once a CTI Event is received by processing unit 100, a numeric context ID may be extracted for that CTI event. For example the numeric context ID may be set as or may be equal to the complete call ID. As used herein, a call ID or a complete call ID may relate to an identification number associated with a call. In an initialization stage or phase, the number of worker threads is calculated. For example, if processing unit 100 has 8 processing cores and the predefined factor is set to 1, 11 worker threads may be initialized. During routine operation, incoming CTI events may be designated to a specific worker thread according to the modulo of the complete call ID by 11.

Figure 5:
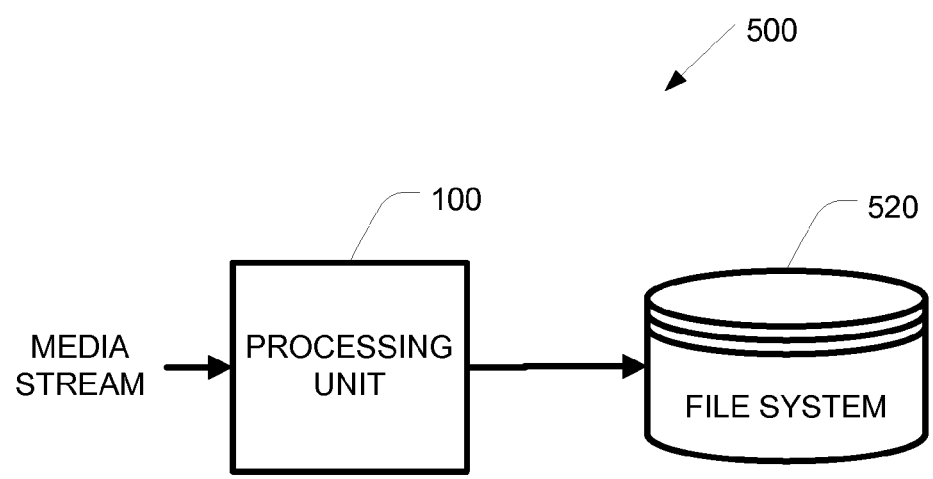
FIG. 5 is a schematic illustration of an exemplary system for saving media streams according to embodiments of the present invention.

Reference is now made FIG. 5 which is a schematic illustration of an exemplary system 500 for saving media streams utilizing worker pool management according to embodiments of the present invention. In system 500 processing unit 100 may be required to write buffers of files such as media files to file system 430, wherein a single file may be divided among a plurality of buffers. In this example the file name may be used as the Context ID and the context ID may be translated to a numeric context ID using Hash code. For example, Java command filename.hashCode( ) may be used to convert the file name to the numeric context ID. Since all buffers related to the same file receive the same numeric context ID, buffers of the same file are handled in the same order in which they were received.

Figure 6:
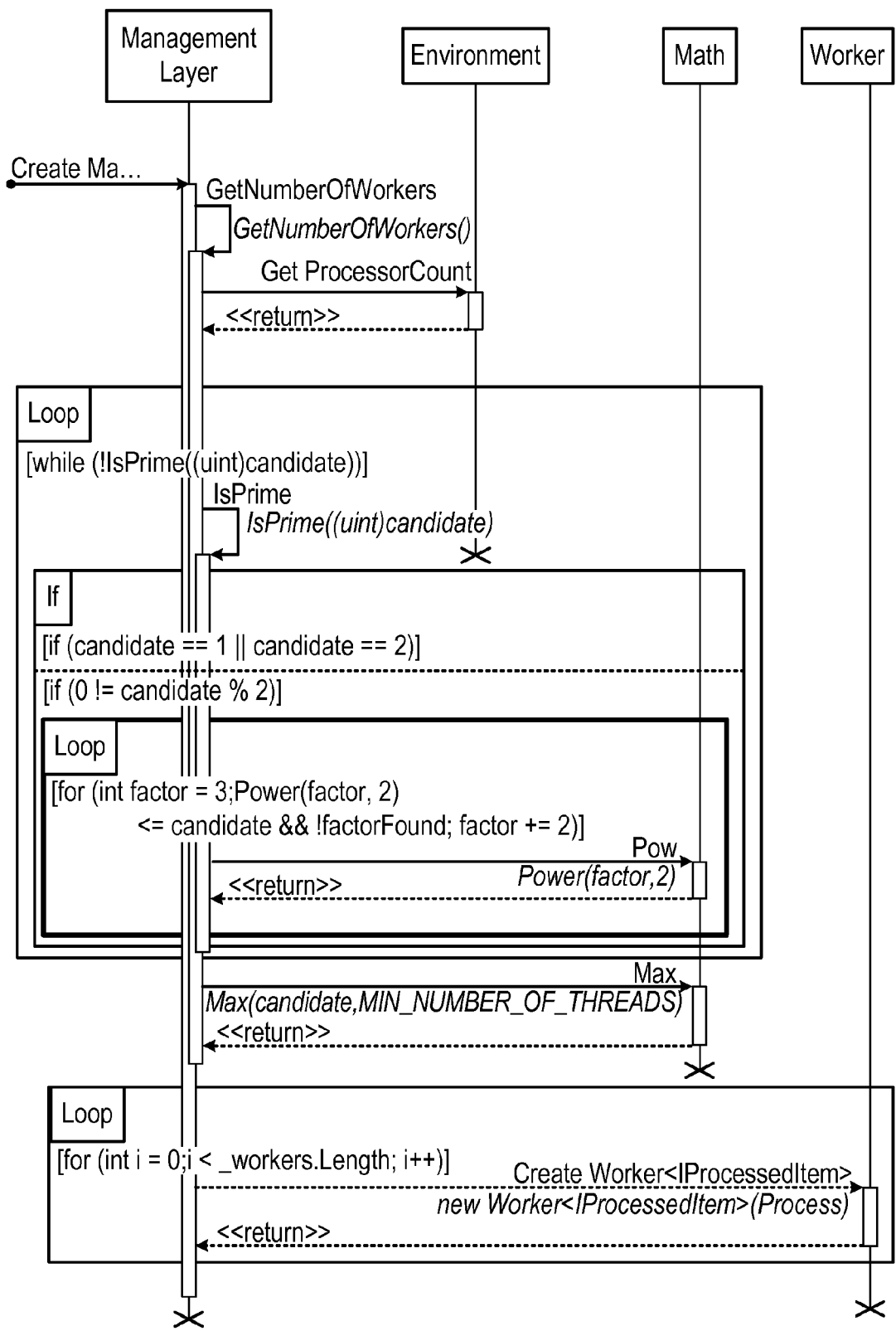
FIG. 6 is a sequence diagram for an implementation of a method of worker pool initialization according to embodiments of the present invention.
Figure 7:
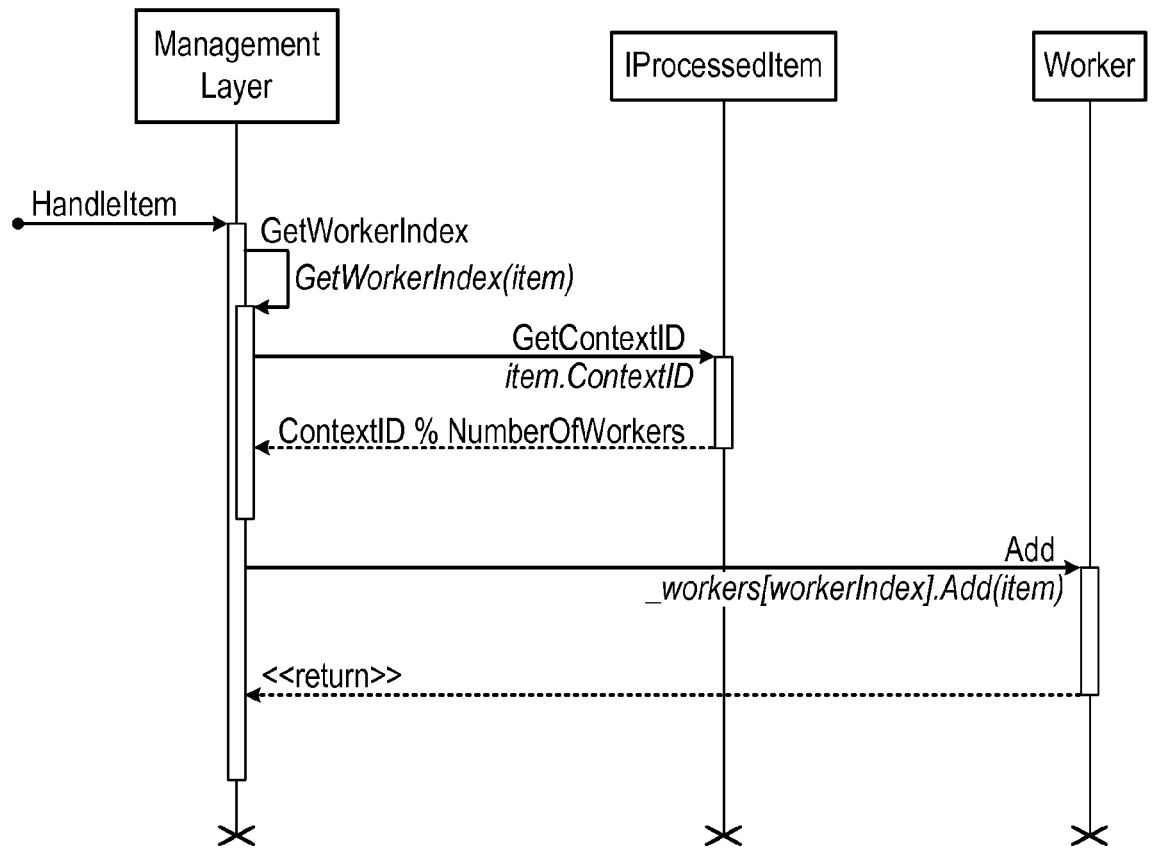
FIG. 7 is a sequence diagram for an implementation of a method of tasks distribution among worker threads according to embodiments of the present invention.

Reference is now made to FIG. 6 which is a sequence diagram of a software implementation of a method of worker pool initialization, and to FIG. 7 which is a sequence diagram of a software implementation of a method of tasks distribution among worker threads according to embodiments of the present invention.

Table 1 presents data structures used for the software implementations shown in FIGS. 6 and 7 may refer to the interface expected from any item that should be handled by the system, and "Worker" refers to the workers in the pool.

TABLE 1

| data structures: | | |
|---|---|---|
| Item: | | |
| | Long | ContextID |
| | ItemType | data |
| Worker: | | |
| | Queue | Items Queue |
| | Thread | Processing Worker Thread |

Table 2 presents a comparison between using a single thread and a worker pool according to embodiments of the present invention with the same hardware of system 400 in two different network configurations. The values in the table 2 represent call rate (new calls per second) which were handled without latency by the software module.

TABLE 2 the number of new calls per second that are handled without latency

|  | Configuration 1 | Configuration 2 |
|---|---|---|
| Single Thread Model | 56 | ~5 |
| Suggested Thread Model | 87 | 38 |

As can be seen in table 1, call rate has increased from 56 to 87 in the first network configuration and from approximately 5 to 38 in the second configuration. Since all other parameters remained the same, this change may be attributed to the worker pool management method of embodiments of the present invention.

In many applications it is required to perform tasks related to the same context in the order in which they were received. For example, in the application presented in FIG. 4, processing of two CTI events representing Start and Stop of a phone call must be processed in the order they were received, e.g. Start Call" before "End Call". When managing worker pools according to embodiments of the present invention, tasks related to the same context are necessarily performed in the order in which they were received. Since tasks related to the same context are given the same numeric context ID these tasks are dispatched to the same worker thread. Thus these tasks will be ordered within the queue of the worker thread and eventually executed in the order in which they were received.

When managing worker pools according to embodiments of the present invention in applications in which the number of contexts and tasks is large and the processing time of each individual task is short, it is expected that tasks will be substantially or nearly equally distributed among worker threads. This is attributed to selecting a prime number of worker threads combined with the nature of the modulo operation. If, for example a composite number of worker threads are used and tasks are distributed among worker threads using the modulo operation, than if the context IDs of tasks are for some reason multiplications of the divisors of that composite number, the worker thread IDs would also be multiplications of these divisors. Hence, tasks will be dispatched to worker threads having worker thread IDs that are multiplications of the divisors. As a result, worker threads having worker thread IDs that are multiplications of the divisors may be overloaded and workers having worker thread IDs that are not multiplications of the divisors may be starved. This in turn could lead to wasting of processing resources.

On the other hand, if a prime number of worker threads is used as described herein, this situation could occur only if the context IDs of tasks are multiplications of that prime number itself (or multiplications of that prime number shifted by a constant number). If the selected prime number is large enough (for example larger than 3) this is unlikely. Therefore it is expected that worker threads would be nearly evenly loaded and that utilization of processing resources would increase.

Another important advantage of an embodiment of the method for managing worker pools described herein is that the algorithm is simple to develop and maintain, extremely time efficient and requires very low processing resources.

Embodiments of the present invention may be implemented in hardware, firmware, software, or any combination thereof. Embodiments of the present invention may also be implemented as instructions stored on an article such as a non-transitory machine-readable medium, which may be read and executed by one or more processors or controllers. When executed by a processor or controller, these instructions cause the processor or controller to carry out methods disclosed herein. A non-transitory machine-readable medium may include any mechanism for storing or transmitting information in a form readable by a machine (e.g., a computing device). For example, a non-transitory machine-readable medium may include read only memory (ROM); random access memory (RAM); magnetic disk storage media; optical storage media; flash memory devices; and others.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A method for allocating tasks to be executed in a processing unit by a predetermined number of one or more processing cores, the method comprising:
   at an initialization stage:
      determining a first number by multiplying the number of processing cores and a predetermined factor;
      determining a second number by selecting a prime number that is not smaller than the first number;
      setting a number of worker threads to the second number;
      assigning a worker identification number (ID) to each worker thread, wherein the worker IDs are consecutive positive integers ranging from zero to the number of worker threads minus one; and
   at a processing stage:
      receiving from a dispatcher of the processing system a task having a numeric context ID; and
      designating the task to one of the worker threads, wherein the worker ID of the designated worker thread equals the numeric context ID of the task, modulo the number of worker threads.

2. The method of claim 1, wherein the numeric context ID is unique for each context of a plurality of contexts.

3. The method of claim 1, wherein the numeric context ID is constant for each context of a plurality of contexts.

4. The method of claim 1, wherein the tasks are writing buffers of files to a file system, wherein a plurality of buffers holds context of a single file.

5. The method of claim 4, wherein the numeric context ID is a Hash code of a file name.

6. The method of claim 1, wherein the tasks are computer telephony integration (CTI) events.

7. The method of claim 6, wherein the numeric context ID equals Call ID.

8. The method of claim 1, wherein the number of worker threads is a smallest prime number not smaller than the number of processing cores multiplied by the predetermined factor.

9. The method of claim 1, wherein the predetermined factor equals one.

10. A processing unit comprising:
   one or more processing cores;
   a controller configured to
      at an initialization stage:
         determine a first number by multiplying the number of processing cores and a predetermined factor;

determine a second number by selecting a prime number that is not smaller than the first number;

set a number of worker threads to the second number;

assign a worker identification number (ID) to each worker thread, wherein the worker IDs are consecutive positive integers ranging from zero to the number of workers minus one; and at a processing state:

receive from a dispatcher of the processing system a task having a numeric context ID; and designate the task to one of the worker threads, wherein the worker ID of the designated worker thread equals the numeric context ID of the task, modulo the number of worker threads.

11. The processing unit of claim 10, wherein the numeric context ID is unique for each context of a plurality of contexts.

12. The processing unit of claim 10, wherein the numeric context ID is constant for each context of a plurality of contexts.

13. The processing unit of claim 10, wherein the tasks are writing buffers of files to a file system, wherein a plurality of buffers holds context of a single file.

14. The processing unit of claim 13, wherein the numeric context ID is a Hash code of a file name.

15. The processing unit of claim 10, wherein the tasks are computer telephony integration (CTI) events.

16. The processing unit of claim 15, wherein the numeric context ID equals Call ID.

17. The processing unit of claim 10, wherein the number of worker threads is a smallest prime number not smaller than the number of processing cores multiplied by the predetermined factor.

18. The processing unit of claim 10, wherein the predetermined factor equals one.

19. A method for allocating tasks to be executed in a processing unit by a predetermined number of one or more processing cores, the method comprising:

determining a first number by multiplying the number of processing cores and a predetermined factor;

determining a second number by selecting a prime number that is not smaller than the first number;

setting a number of worker threads to the second number;

assigning a numeric context identification number (ID) to tasks, wherein related tasks are given a common numeric context ID; and assigning a task to a worker thread number that equals the remainder of a division of a numeric context ID of the task by the number of worker threads.

* * * * *